March 19, 1968  J. H. BLACK ET AL  3,373,870
CIGAR CLASSIFICATION APPARATUS
Filed July 8, 1966
FIG. 1
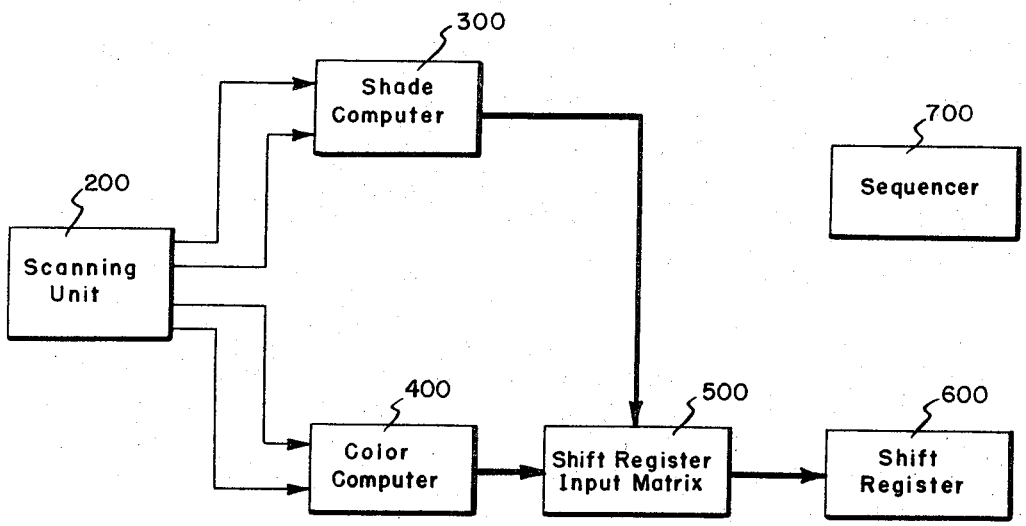
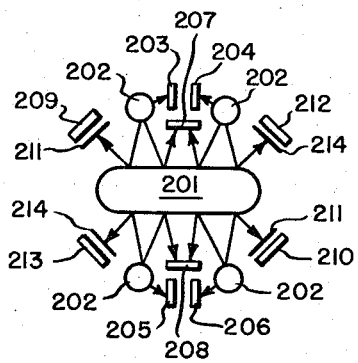
FIG. 2a
FIG. 2b
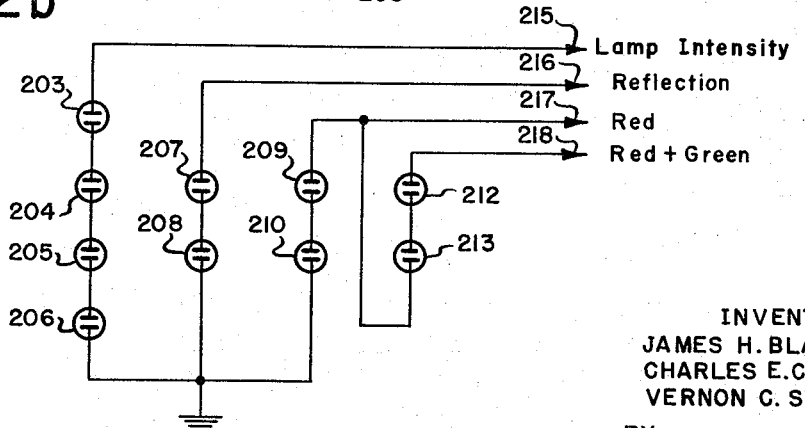
INVENTORS
JAMES H. BLACK
CHARLES E. COLEMAN
VERNON C. STANT
BY
ATTORNEYS

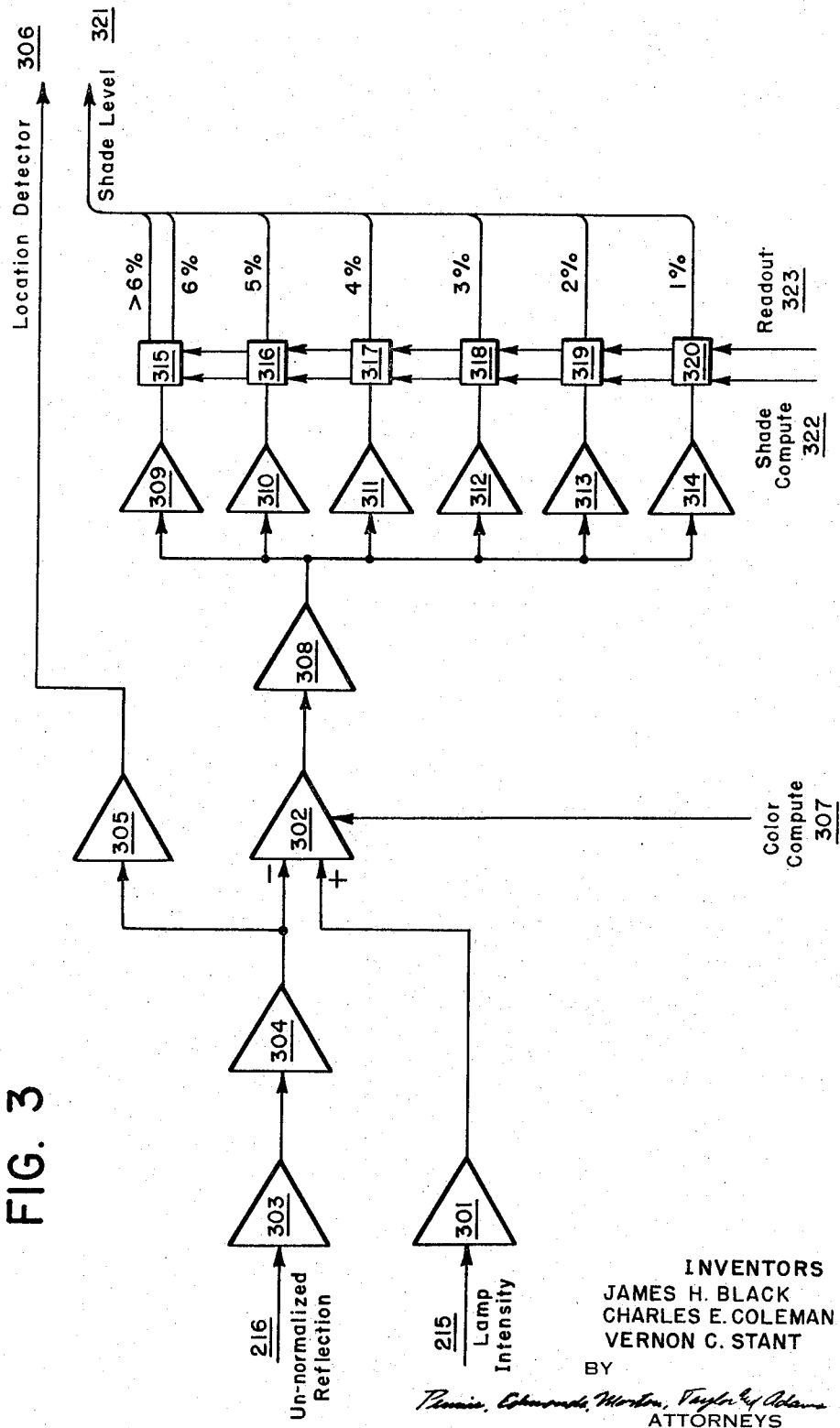

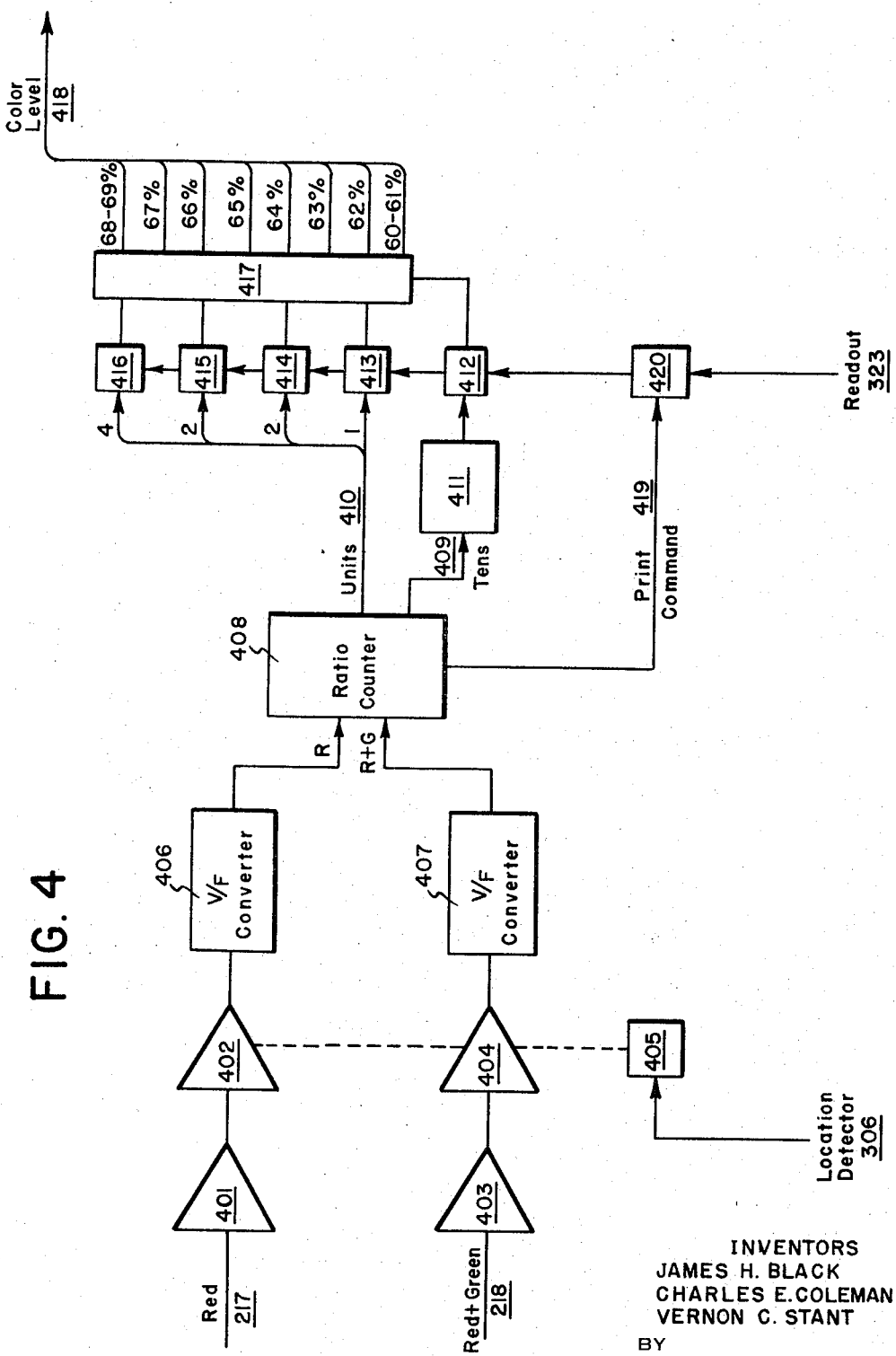

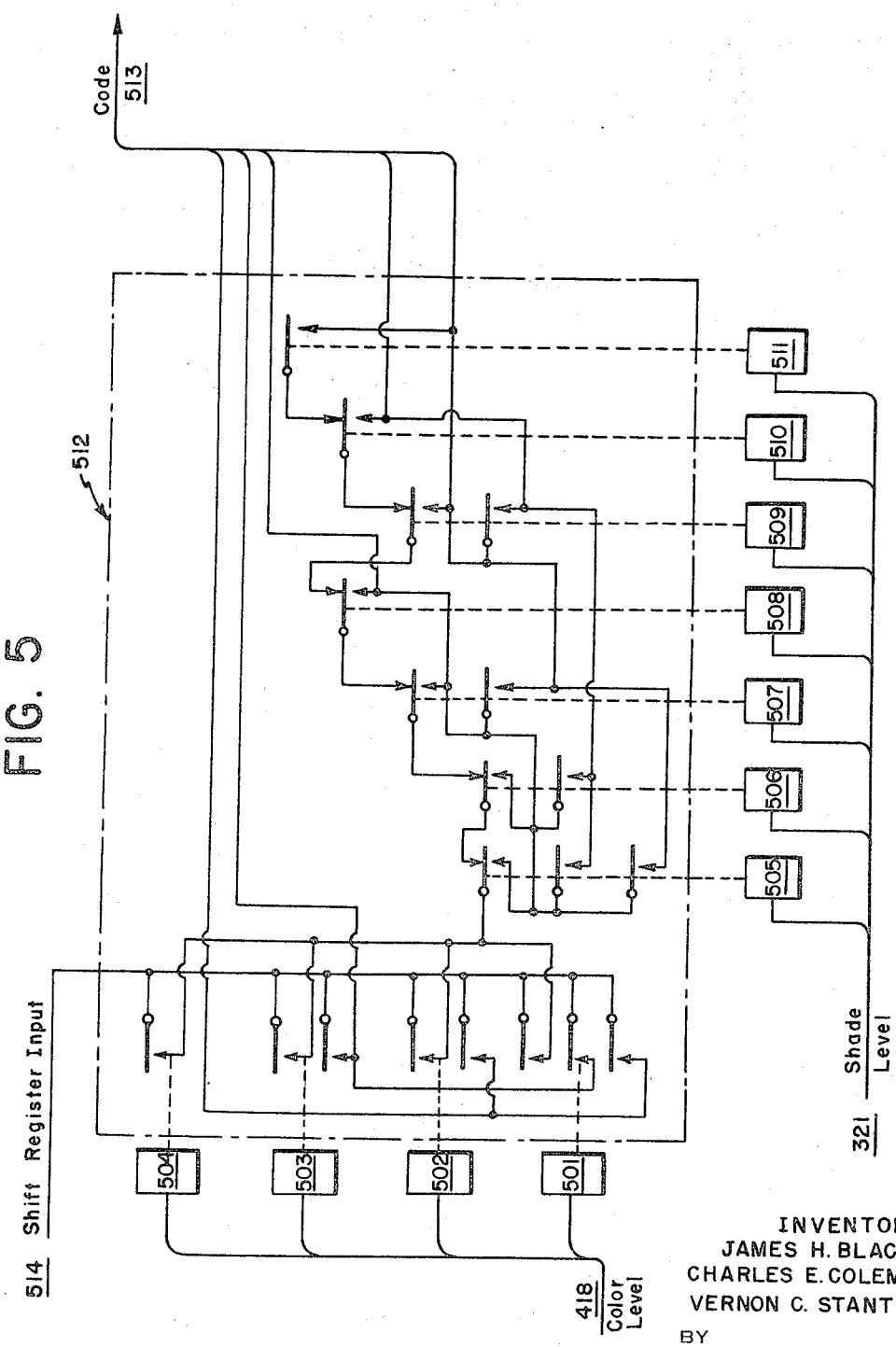

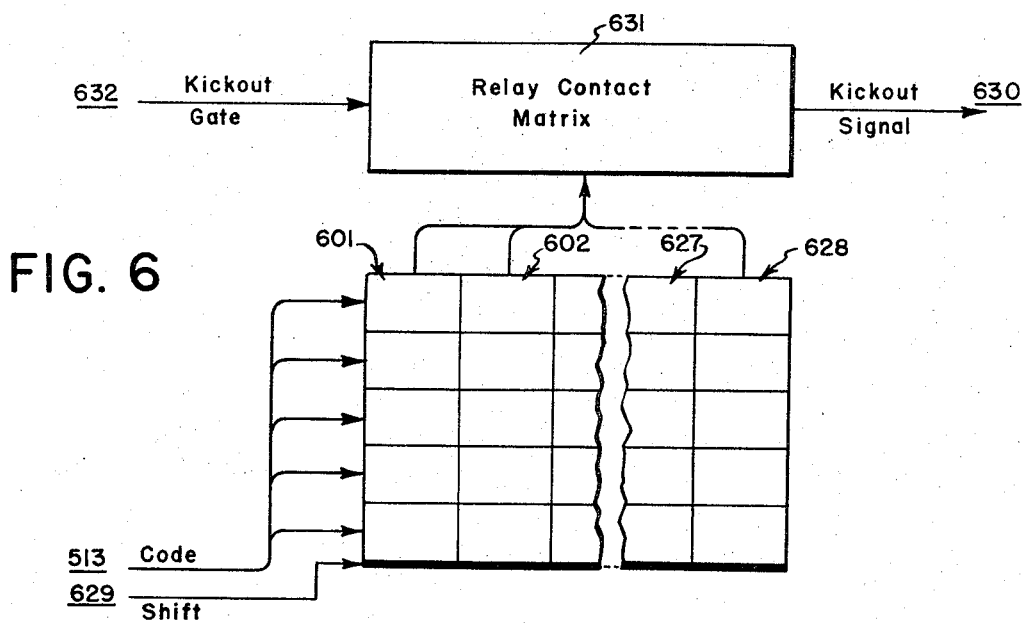
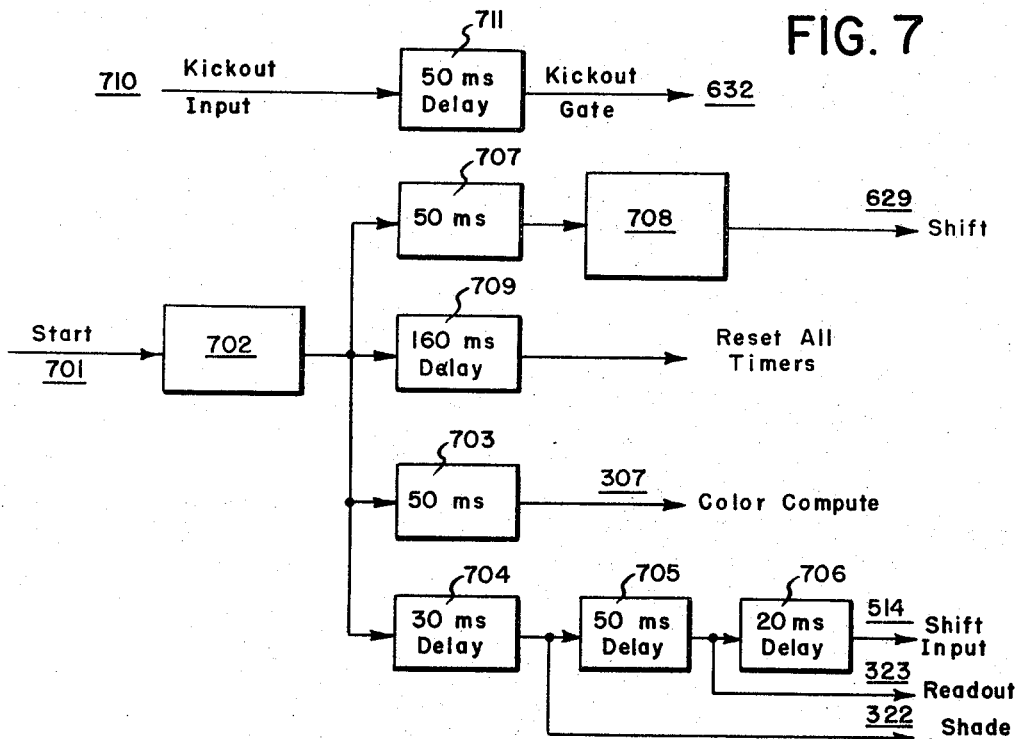

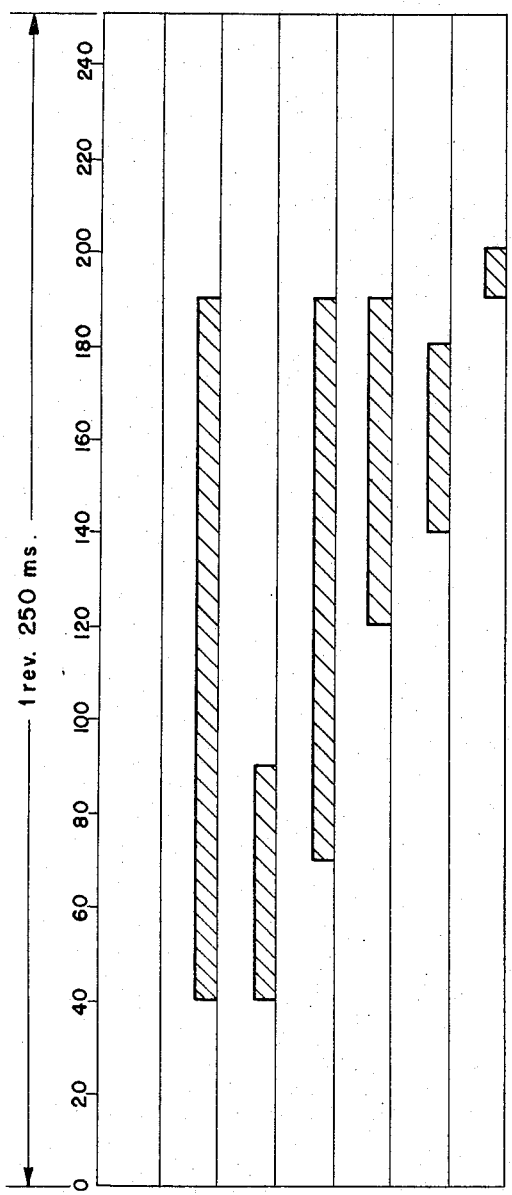

ര്‍3,373,870
Patented Mar. 19, 1968

3,373,870
CIGAR CLASSIFICATION APPARATUS
James H. Black, Quinton, and Charles E. Coleman and Vernon C. Stant, Richmond, Va., assignors to The American Tobacco Company, New York, N.Y., a corporation of New Jersey
Filed July 8, 1966, Ser. No. 563,906
6 Claims. (Cl. 209—111.6)

The present invention relates to apparatus for classifying an object according to its color characteristics, and more particularly to apparatus for classifying cigars according to predetermined categories of color and shade.

The cigar classifier of the present invention is an electronic apparatus having the specific object of sorting cigars into predetermined categories according to the color characteristics of the cigar wrappers. The invention operates on the principle of sorting out cigars having the same color characteristics rather than actually measuring the color of each cigar. The absolute color of the cigar wrapper is of little importance in the overall application of color sorting, and the important consideration is the grouping of cigars having similar visual characteristics, in both color and shade, in the same categories.

The categories to which the cigars are assigned are based on two measured variables. One variable is the color present in the cigar wrapper and the other is the light or dark appearance, called shade, of the wrapper.

To measure these variables each cigar is illuminated in sequence by multichromatic incandescent lamps and the light incident upon and reflected from the cigar is detected by photovoltaic cells. The photovoltaic cells generate four electric signals which correspond to the following variables:

(a) the intensity of the light incident on the cigar;
(b) the intensity of the light reflected from the cigar;
(c) the intensity of a first color (e.g., red) reflected from the cigar; and
(d) the intensity of a second color (e.g., blue-green) reflected from the cigar.

These four electric signals are used to determine the predominant color characteristics of the cigar wrapper in the following manner. The shade of cigar is computed by comparing the reflected light intensity signal with the incident light intensity signal and submitting the resulting difference to a seires of voltage level detectors which generate one of a plurality of shade level signals depending upon the relative intensity of the reflected light. If the intensity of the illuminating light is maintained substantially constant the reflected light signal need not be compared with the incident light signal and can be submitted directly to the level detectors to generate a shade level signal. At the same time the shade computing process is taking place, the intensity of the first reflected color is electronically divided by the sum of the signals representing the intensities of the first and second reflected colors to give a color quotient value for the cigar corresponding to the percent of the first color in the cigar wrapper, i.e., $$\text{Percent Color 1} = \frac{\text{Color 1}}{\text{Color 1} + \text{Color 2}}$$

The color quotient is classified into one of a plurality of color levels and this color level and the cigar shade level are combined in a relay matrix to furnish a category classification code for the cigar. The code for the cigar is stored in a shift register memory unit until the cigar, moving along a conveying system, reaches its assigned destination whereupon the shift register operates an electromechanical kickout device and the cigar is placed in its assigned category location.

The color classifying apparatus of the present invention is particularly effective in classifying and sorting cigars according to predetermined color characteristics at high speed. The apparatus is capable of classifying more than 200 cigars per minute. However it will be obvious that the invention is not limited to sorting cigars but can be applied to color classifying other objects such as tobacco leaf, fruits, vegetables, manufactured articles and the like. Moreover, although the two reflected colors, red and blue-green, employed in the cigar classifier herein described are particularly suited for use in computing the color characteristics of cigar wrappers, it should be understood that the principle of the invention extends to the use of any two reflected colors which span the range of color categories into which an object is to be classified.

These and further objects and advantages of the present invention will be more readily understood when the following description is read in connection with the accompanying drawing in which:

FIG. 1 is a schematic diagram showing the basic units of the cigar classifier of the present invention;

FIG. 2(a) is a schematic diagram showing the physical arrangement of the Scanning Unit of the cigar classifier;

FIG. 2(b) is a schematic diagram of the electrical arrangement of the Scanning Unit;

FIG. 3 is a schematic diagram showing the Shade Computer Unit of the cigar classifier;

FIG. 4 is a schematic diagram showing the Color Computer Unit of the cigar classifier;

FIG. 5 is a schematic diagram showing the Shift Register Input Matrix Unit of the cigar classifier;

FIG. 6 is a schematic diagram showing the Shift Register Unit of the cigar classifier;

FIG. 7 is a schematic diagram of the Sequencer Unit of the cigar classifier; and FIG. 8 is a timing diagram showing the sequence and duration of control signals in the cigar classifier.

General description

Referring to FIG. 1, the basic block diagram of the cigar sorter, the six basic units of the apparatus may be seen. Each of these units will be considered in more detail in conjunction with a separate figure below. The Scanning Unit 200 views each cigar in sequence and generates four electrical signals during each scanning operation. Two of these signals (total light incident on the cigar and total light reflected from the cigar) are sent to the Shade Computer 300 which measures and classifies the difference between these signals into one of seven predetermined Shade Levels. The other two signals from the Scanning Unit (amount of red light reflected from the cigar and the sum of red plus green light reflected) are processed by the Color Computer 400 which divides the red signal by the red plus green signal and classifies the resulting color quotient into one of eight predetermined color levels.

The color level signal and shade level signal computed for each cigar are sent to the Shift Register Input Matrix 500 which combines the signals to produce a class code indicative of the color-shade category to which the cigar belongs. The class code for each cigar is transmitted in sequence to a Shift Register 600 which stores the code information until the cigar in moving along a conveying system has reached a position associated with its coded class, whereupon the Shift Register actuates a kick-out gate to place the cigar in its assigned group. A Sequencer Unit 700 generates the timing signals required to control the operation of the cigar classifier.

Detailed description

Cigars to be classified are carried in sequence on an indexing chain to be presented one by one to the Scanning Unit 200, the physical arrangement of which is shown schematically in FIG. 2(a). Each cigar 201 in turn moves vertically into the scanning area between four quartz incandescent lamps 202, two mounted on each side of the cigar. The Scanning Unit is designed to scan the cigar from diametrically opposite sides to view the maximum possible area of the cigar and minimize the effect of local variations in the cigar wrapper. The light incident on and reflected from the cigar wrapper is measured by a series of photovoltaic cells mounted in the Scanning Unit. These photo-cells generate a voltage proportional to the intensity of the light detected.

Four photo-cells 203–206 are mounted in a position to measure the light output of the incandescent lamps 202. Two photo-cells 207 and 208 are provided with filters having the same light spectrum response as the human eye and are arranged to measure the light reflected from the cigar. These photo-cells produce a voltage that is proportional to the visual light reflected from the cigar. Photo-cells 209 and 210 are mounted behind high band-pass light filters 211 that pass the red band of the color spectrum. These photo-cells generate a voltage proportional to the amount of red light reflected from the cigar. Two other photo-cells 212 and 213 are positioned behind low band-pass light filters 214 that pass the blue-green band of the color spectrum. These photo-cells generate a voltage that is proportional to the amount of blue-green light that is being reflected from the cigar.

The ten photo-cells of the Scanning Unit are connected electrically as shown in FIG. 2(b). The four photo-cells 203–206 which measure the incandescent lamp output are connected in series additively to provide a Lamp Intensity signal 215. The photo-cells 207 and 208 which measure total light reflected from the cigar are connected in series additively to generate an un-normalized Reflection signal 216. The two photo-cells 209 and 210 which measure the red reflected light are also connected in series additively to produce a Red signal 217. Finally, the photo-cells 212 and 213 which detect the blue-green reflected light are connected in series additively with themselves and with the Red signal to provide a Red + Green color sum signal 218.

The Lamp Intensity signal 215 and the un-normalized Reflection signal 216 are transmitted by coaxial cable from the Scanning Unit to the Shade Computer 300 shown in FIG. 3. The Lamp Intensity signal 215 is fed to amplifier 301 where it is amplified and connected to the positive input of operational amplifier 302. The un-normalized Reflection signal 216 is amplified by amplifiers 303 and 304 and then fed to the negative input of amplifier 302 and also to the input of amplifier 305. Amplifier 305 is normally biased off; when a cigar appears in the scanning area the resulting Reflection signal turns amplifier 305 on to generate a Location Detector signal 306 which is used in other parts of the apparatus as will be described. Amplifier 302 is an operational amplifier used as a difference circuit. The un-normalized reflected light from the cigar is compared with the incident light and the output voltage of amplifier 302 represents the difference between the two signals, i.e., the normalized light reflection intensity. The feedback resistor within amplifier 302 is normally shorted out by relay circuitry so that the signal appearing at its output is the Lamp Intensity signal voltage only, a positive signal. However, when the Color Compute signal 307 is transmitted to the Shade Computer as hereinafter described the feedback resistor of amplifier 302 is restored to the circuit and the output voltage of the amplifier goes to a negative value, the magnitude depending upon the relative amount of light reflected from the cigar.

The output of amplifier 302 is amplified by amplifier 308 and then fed to a voltage level detector circuit comprising amplifiers 309–314 which are all operational amplifiers biased off. When a negative voltage of sufficient amplitude to overcome the bias is applied to the input of these amplifiers, the output voltage swings from full negative to full positive. Each of the amplifiers 309–314 is biased at a different level with amplifier 309 having the highest bias and amplifier 314 the lowest. The bias value between amplifiers represents approximately 1% change in light reflected from the cigar.

When an input signal turns on one or more of the amplifiers 309–314, the positive output voltage of the amplifier, conditioned by the presence of a Shade Compute signal 322 described below, turns on an associated relay circuit 315–320. The relay contacts of these circuits are so interlocked that only the highest one of seven Shade Level signals 321 is generated and this generation is also conditioned upon the presence of a Readout gate signal 323 which is generated and transmitted to the Shade Computer in a manner to be hereafter described.

While the Shade Computer processes two of the signals generated in the Scanning Unit, the two other signals produced there are operated upon by the Color Computer shown in FIG. 4. The Red signal 217 representing the red content of the cigar wrapper reflection is fed to operational amplifiers 401 and 402. The Red+Green signal 218 is delivered to operational amplifiers 403 and 404. Feedback resistors in amplifiers 402 and 404 are normally by-passed by the contacts of a relay circuit 405 to reduce the gain of these amplifiers to zero and allow no signal to appear at their respective outputs. However, when a cigar appears at the scanning station the Location Detector signal 306 is generated as already described and this signal causes the relay circuit 405 to open its contacts and permit the gain of the amplifiers 402 and 404 to rise to the value determined by the setting of an input resistance gain potentiometer on each amplifier. When each amplifier gain goes to its predetermined value, an output voltage appears at the output terminals of the amplifier as a 700 to 900 mv. D.C. signal.

The output voltage of amplifier 402 representing the Red reflection from the cigar is fed to the input of a Voltage to Frequency Converter 406 such as a Hewlett-Packard model DY-2211. The output of amplifier 404 representing the Red+Green reflection is fed to another Voltage to Frequency Converter 407. The function of the converters is to change a D.C. signal voltage to an A.C. signal having a frequency proportional to the magnitude of the input voltage.

The outputs of the two Voltage to Frequency Converters are fed to separate inputs of an Electronic Ratio Counter 408 such as a Hewlett-Packard model H83–5212 which electronically divides the Red+Green signal into the Red signal to produce a color quotient output representative of the percent of red measured in the cigar wrapper. The output of the Ratio Counter 408 is in the form of two groups of binary coded decimal (BCD) signals arranged in a 1–2–2–4 code. The first output group 409 encodes the "tens" figure of the ratio percent computed by the counter. The second output group 410 encodes in BCD the "units" figure of the computed ratio percentage. The optical scanning system of the cigar sorter is such that the entire color range found in the various cigar wrappers to be classified is covered in a color quotient range of from 60 to 70% of red in the total color.

The first output group 409 of the Ratio Counter is fed to selector circuitry 411 which detects whenever the "tens" group 409 indicates the 60% range has been reached and thereupon actuates gating relay 412. The second output group 410 (the units of the ratio percentage) is fed to selector circuits 413–416 which in turn are connected to counter output matrix circuitry 417 designed to convert the 1–2–2–4 BCD code of the units output group 410 into one of eight Color Level signals 418 (representing 60–61, 62, 63, 64, 65, 66, 67, and 68–69%, respectively). When the electronic Ratio Counter 408 has completed its computation it sends a Print Command pulse 419 to gating relay 420. This command pulse also locks the Counter and causes it to hold its output in a static condition. When a Readout signal 323 is generated as described hereafter it is transmitted to gating relay 420 and through the closed contacts of that relay to selector circuits 412–416 thereby permitting the generation of the selected one of the Color Level signals 418.

Both the Color Level signal 418 produced in the Color Computer and the Shade Level signal 321 generated in the Shade Computer are fed to the Shift Register Input Matrix 500 shown in FIG. 5. The purpose of the Shift Register Input Matrix is to combine the information contained in the Shade Level signal with that contained in the Color Level signal to convert them into a useable form requiring a minimum number of components. Although the combination of a possible eight Color Level signals with seven Shade Level signals would permit the classification of 56 different color-shade classes, the embodiment shown in the drawing is limited to only 28 desired categories. In FIG. 5, four Color Level signals 418 and seven Shade Level signals 321 are combined in the Input Matrix to furnish 28 different color-shade classes. With some types of cigar wrappers it would be desirable to use seven colors and four shades while on other wrappers with close color control it would be desirable to use seven shades and four color signals for classification.

The four Color Level signals 418 are fed to the four vertical bank relays 501–504 and the seven Shade Level signals 321 are connected to the seven horizontal bank relays 505–511 of the Shift Register Input Matrix. The two level input signals operate one relay in each bank, one in the vertical bank and one in the horizontal bank. The relays control the contacts of a switching matrix 512 as shown in FIG. 5, and depending upon which pair of relays operate, a unique five digit Code signal 513 is generated in a binary code capable of distinguishing all 28 categories to be sorted. The Code signal generation is further conditioned on the presence of a Shift Register Input signal 514 described hereafter.

The five-line Code signal 513 is fed to the Shift Register unit 600, shown in FIG. 6, which serves as a memory device to ensure that each cigar is shunted to its proper category location. The energization of one or more lines of the Code signal causes the corresponding circuits of a register 601 to store the code corresponding to that one of 28 color-shade categories assigned to the cigar at the Scanning Unit. There are 28 registers 601–628 of which only the first two and the last are shown in FIG. 6. Whenever a Shift pulse 629 is generated as hereafter described it is transmitted to each one of the 28 registers and causes the information stored in each of the first 27 registers to advance to the next register, also clearing register 601 to receive a new code. Each time a cigar moves past the Scanning Unit a Shift pulse 629 is generated to move the coded information about that cigar one position. As the cigar moves along a conveying system, the information moves along the Shift Register. When the cigar has arrived at a location corresponding to the category encoded in the Shift Register for that cigar, a Kickout signal 630 is generated to trip the cigar by electromechanical means not shown into the correct slot or hopper.

The coded information stored in the 28 Shift Registers 601–628 is presented to a Relay Contact Matrix 631 which compares the code stored in each register with a code assigned to that register. When a coincidence between an assigned code and a stored code is observed in a register, the Relay Contact Matrix 631 sets up a contact path to energize that one of the 28 Kickout signals 631 corresponding to the assigned code. When a Kickout Gate signal 632 is generated as hereafter described, the path to energize the appropriate Kickout Gate 630 is completed and the cigar is mechanicaly tripped from the conveyer system into a slot or hopper corresponding to the color-shade category computed for it.

The Kickout Gate signal 632, as well as other timing signals already mentioned, is generated in the Sequencer Unit 700 shown in FIG. 7. In the cigar sorter application described above, cigars are presented to the Scanning Unit at the rate of 240 per minute, i.e., one cigar every 250 ms. Half of that 250 ms. period is devoted to moving a cigar into position at the scanning station and in the remaining 125 ms. of each cycle the cigar remains stationary at the scanning station. When the cigar first moves into the scanning area, the location Detector signal 306 is generated as already described in connection with the Shade Computer 300. When the cigar has been moved completely into scanning position, the indexing conveyor chain upon which it is borne causes a Start pulse 701 to be sent to the Sequencer.

The Start pulse 701 triggers a start multivibrator circuit 702 which in turn triggers a series of timer circuits 703–709. The start circuit causes timer 703 to turn on the Color Compute signal 307 for 50 ms. after the occurrence of the Start pulse. Thirty milliseconds after the Start pulse, timer 704 generates the Shade Compute signal 322 which is sent to the Shade Computer. Timer 705 operates 50 ms. after the Shade Compute pulse occurs to generate the Readout gate signal 323, and 20 ms. later timer 706 sends out the Shift Input pulse 514 to the Shift Register Input Matrix 500. The Start pulse also triggers timer 707 which furnishes a 50 ms. output signal to actuate relay circuitry 708 which thereupon removes a supply voltage from the Shift Register unit for 50 ms., enabling the unit to shift one position. Timer 709 operates 160 ms. after the Start pulse to reset all the timers 703–709 to a static condition to await the next Start pulse. The Kickout Input signal 710 is derived from a magnetic pickup on the conveyor system (not shown) which carries the cigar after it leaves the scanning station. Each time a cigar conveyor pocket moves over a category slot or hopper, a signal 710 is generated and fed to a 50 ms. multivibrator circuit 711 which furnishes the Kickout Gate 632 to the Shift Register relay contact matrix 631. The occurrence of a match between the code in a shift register position and its assigned code causes the appropriate kickout relay to operate and eject the cigar into its proper slot or hopper.

The sequence and duration of the various timing signals generated in the Sequencer Unit are shown in the timing diagram of FIG. 8.

It may be seen that the invention described above provides an effective and high-speed apparatus for classifying an object in one of a plurality of categories associated with color and shade levels. The classifier employs multichromatic light means for illuminating the object to be classified and first photoelectric means for generating a reflection signal corresponding to the intensity of the light in a spectral range reflected from the object relative to the intensity of the light illuminating the object. Second and third photoelectric means are provided to measure the intensities of first and second colors in the spectral range reflected from the object and generate first and second color signals corresponding to those respective intensities. The first color signal is divided electronically by the sum of the first and second color signals to produce a color quotient signal the magnitude of which is detected to select one of a plurality of color level signals. The magnitutde of the reflection signal is also sensed to energize one of a plurality of shade level signals. The color level and shade level signals for the object are then used to control distribution means for placing the object at a predetermined location corresponding to the category associated with the color and shade levels represented by those signals.

It will be understood that various changes in the details, steps and arrangements of parts which have been herein described and illustrated in order to explain the nature

What is claimed is:

1. Apparatus for classifying an object in one of a plurality of categories associated with color and shade levels comprising:
   (a) multichromatic light means for illuminating said object;
   (b) first photoelectric means for generating a reflection signal corresponding to the intensity of light in a spectral range reflected from said object;
   (c) second photoelectric means for generating a first color signal corresponding to the intensity of light of a first color in the spectral range reflected from said object;
   (d) third photoelectric means for generating a second color signal corresponding to the intensity of light of a second color in the spectral range reflected from the object;
   (e) electronic means for dividing the first color signal by the sum of the first and second color signals to produce a color quotient signal;
   (f) means responsive to the magnitude of the color quotient signal for selecting one of a plurality of color level signals;
   (g) means responsive to the magnitude of the reflection signal for selecting one of a plurality of shade level signals;
   (h) means responsive to the color level and shade level signals for placing the object at a location corresponding to the category associated with the color and shade levels represented by those signals.

2. Apparatus according to claim 1 wherein the first photoelectric means comprises a first sensor means for measuring the intensity of the light illuminating the object and second sensor means for measuring the intensity of light reflected from the object wherein the measurements of said sensors are compared to produce the reflection signal.

3. Apparatus according to claim 1 wherein the first color is red and the second color is blue-green.

4. Apparatus according to claim 1 wherein the first and second color signals are added to produce a color sum signal and said electronic means comprises a first and second converter means for converting the first color and color sum signals to first and second frequency signals, respectively, said frequency signals having frequencies proportional to the magnitudes of the first color signals and the color sum signal, respectively, and ratio counter means for generating the color quotient signal corresponding to the ratio of the first and second frequency signals.

5. Apparatus according to claim 1 including indexing means for carrying a plurality of objects sequentially past said photoelectric means whereby the objects are classified in sequence.

6. Apparatus according to claim 1 having means for storing the color level and shade level of said object in coded form.

References Cited

UNITED STATES PATENTS

| | | | |
|---|---|---|---|
| 2,923,827 | 2/1960 | Dessauer et al. | 88—14 |
| 3,048,270 | 8/1962 | Green et al. | 209—111.6 |
| 3,069,013 | 12/1962 | Neubrech et al. | 209—111.6 |

ALLEN N. KNOWLES, *Primary Examiner.*